United States Patent
Goebel et al.

(10) Patent No.: US 7,248,991 B2
(45) Date of Patent: Jul. 24, 2007

(54) METHOD AND DEVICE FOR DETECTING A ROTATIONAL SPEED, ESPECIALLY THE ROTATIONAL SPEED OF THE WHEEL OF A VEHICLE

(75) Inventors: Eugen Goebel, Dahlheim (DE); Manfred Fuss, Dorweiler (DE); Ingo Alfter, Sinzig (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 11/230,077

(22) Filed: Sep. 19, 2005

(65) Prior Publication Data

US 2006/0064274 A1     Mar. 23, 2006

Related U.S. Application Data

(63) Continuation of application No. PCT/EP2004/002523, filed on Mar. 11, 2004.

(30) Foreign Application Priority Data

Mar. 19, 2003   (DE) ............................... 103 12 208

(51) Int. Cl.
*G01P 3/00*   (2006.01)
(52) U.S. Cl. ............... 702/148; 702/141; 702/142; 702/143; 702/144; 702/145; 702/146; 702/147; 324/76.38
(58) Field of Classification Search ............... 702/148, 702/141, 142, 145–147; 324/76.24, 76.82, 324/76.38
See application file for complete search history.

(56) References Cited

U.S. PATENT DOCUMENTS

| 4,092,853 | A | | 6/1978 | Schneider et al. |
| 4,680,714 | A | * | 7/1987 | Kubo ........................... 701/79 |
| 4,807,164 | A | * | 2/1989 | Onyon ....................... 702/147 |
| 4,881,174 | A | | 11/1989 | Gimmler |

FOREIGN PATENT DOCUMENTS

GB          251 003       10/1987

* cited by examiner

*Primary Examiner*—Marc S. Hoff
*Assistant Examiner*—Phuong Huynh
(74) *Attorney, Agent, or Firm*—MacMillan, Sobanski & Todd, LLC

(57) ABSTRACT

The invention relates to a method and an apparatus for measuring a rotational speed, in particular a rotational speed of a wheel of a motor vehicle, by means of a speed sensor, wherein the speed sensor produces an output signal characterizing the actual rotational speed and wherein the output signal of the speed sensor is sampled and further processed in accordance with sampled values thus obtained. For an—in hardware terms—simple realization, according to the invention it is provided that the output signal is sampled at a predetermined sampling rate over at least one measuring cycle, that in each case the amplitude of sampled values obtained in the measuring cycle is determined and that from the rate of occurrence of sampled values of an amplitude lying within a predetermined amplitude range at least one signal level occurring during the measuring cycle in the output signal is determined.

23 Claims, 3 Drawing Sheets

METHOD AND DEVICE FOR DETECTING A ROTATIONAL SPEED, ESPECIALLY THE ROTATIONAL SPEED OF THE WHEEL OF A VEHICLE

CROSS REFERENCE TO RELATED APPLICATIONS

This application is a continuation of International Application No. PCT/EP2004/002523 filed Mar. 11, 2004, the disclosures of which are incorporated herein by reference, and which claimed priority to German Patent Application No. 103 12 208.7 filed Mar. 19, 2003, the disclosures of which are incorporated herein by reference.

BACKGROUND OF THE INVENTION

The present invention relates to a method of measuring a rotational speed of a wheel of a motor vehicle and to an apparatus for measuring a rotational speed of a wheel of a motor vehicle.

Such methods and apparatuses are known from the background art. For control of recently designed brake systems or traction control systems that is tuned to the actual vehicle operating state, the rotational speed of individual wheels of a motor vehicle has to be monitored permanently with sufficiently high precision. For this purpose, speed sensors of various designs, such as for example inductive sensors, Hall sensors or the like, are used. Such speed sensors generally supply a pulsating output signal with offset, which ideally ranges between only two current values, a low current value also known as "low" current, which is for example ca. 7 mA, and a higher current value, also known as "high" current, which is for example ca. 14 mA. The "low" current arises, for example, when the sensor is not measuring a signal, whilst the "high" current arises when the sensor is measuring a signal. Ideally, i.e. in the case of measurement with high-frequency sampling, a distribution of sampled values that very precisely reproduces the actual characteristic of the output signal is obtained, wherein signal edges are also measured. With the aid of statistical formulations, it is then possible to determine the sampled values, the amplitudes of which occur most frequently. The value that occurs most frequently is then also referred to as "mode".

It has however emerged that during operation of a motor vehicle the rotational speed measurement may be adversely affected by various disturbing influences. For example, an unwanted series resistance in the sensor line, short circuits or components of impaired function may lead to a displacement of the signal level of the output signal. As a result of this, the decoding electronics are no longer able to identify the signal level correctly and after further processing possibly transmit false digital pulses. The brake system or traction control system would consequently use false wheel speeds, thereby possibly leading to a malfunction. In order to be able to identify such errors, from the output signal in each case both current levels, namely the "low" current and the "high" current, have to be measured in order to ensure that the decoding electronics are able to convert these signal levels correctly into digital signals. However, as the output signal is a frequency signal, according to Shannon's sampling theory the sampling frequency would have to be at least twice as high as the highest frequency occurring in the signal to be sampled. This would result in a sampling frequency that demanded a considerable computing capacity of a processor. Corresponding processors are cost-intensive to acquire and therefore add undesirably to the cost of the total system.

From DD 251 003 A5, and corresponding U.S. Pat. No. 4,807,164, both of which are incorporated by reference herein, an apparatus for measuring a rotational speed of a wheel of a motor vehicle is known. This apparatus comprises a sensor for measuring the actual rotational speed and produces a corresponding output signal. A sampling device samples the output signal of the speed sensor at a predetermined sampling rate per measuring cycle. A signal processing device processes an output signal sampled by the sampling device and determines the amplitudes of the sampled values obtained in the measuring cycle. The sampled values are then correlated, with the result that a function providing information about the actual velocity of the moving body is obtained.

BRIEF SUMMARY OF THE INVENTION

An object of the present invention is to provide a method and an apparatus of the initially described type, with which a low sampling rate is sufficient for rapid and reliable detection of faults in the measurement of the sensor signals.

This object is achieved by a method of measuring a rotational speed of a wheel of a motor vehicle and by an apparatus for measuring a rotational speed of a wheel of a motor vehicle.

In said case, the speed sensor produces an output signal characterizing the actual rotational speed and the output signal of the speed sensor is sampled and in accordance with sampled values thus obtained is processed further. For achieving the above-mentioned object, the invention further provides that the output signal is sampled at a predetermined sampling rate over at least one measuring cycle, that in each case the amplitude of sampled values obtained in the measuring cycle is determined and that from the rate of occurrence of sampled values of an amplitude lying within a predetermined amplitude range at least one signal level occurring during the measuring cycle in the output signal is determined.

The invention therefore provides that, independently of the maximum frequency and actual period of the sampled output signal, this output signal is sampled at a predetermined sampling rate over a measuring cycle of specific duration. In this case, time-discrete sampled values of varying amplitude are obtained as a measurement result. This measurement result is subsequently analyzed on the basis of the rate of occurrence of sampled values of an amplitude lying within a predetermined amplitude range. From the determined rates of occurrence, at least one signal level is determined.

In a development of the invention, it is provided that from the rate of occurrence of sampled values of an amplitude lying within a predetermined amplitude range per measuring cycle a histogram is created, from which the signal level is determined. The creation of a histogram has the advantage of being a very rapidly measurable and clear way of allowing the determination of one or more signal levels. The signal level or levels with the relatively highest rate of occurrence of sampled values of an amplitude lying within a predetermined amplitude range are, for example, processed further.

For measuring the rates of occurrence, in a variant of the invention it is provided that a predetermined number of amplitude counters is provided, wherein to each amplitude counter a specific amplitude range is assigned and wherein each amplitude counter is incremented when during the measuring cycle a sampled value has an amplitude value falling within the amplitude range assigned thereto. In the present case it may be provided that, as sampled values, current values of the output signal are determined, and that to each amplitude counter there is assigned a current value range from a predetermined measuring range, preferably of 0 to 19 mA. In this case, the current value ranges may also be dimensioned such that they differ in size in order to achieve a current-value-dependent division of the measuring range of differing fineness. In order to obtain comparable results for a plurality of successive measuring cycles, in a development of the invention it may be provided that each amplitude counter is set to zero at the start of a measuring cycle.

As already initially explained, the invention provides that for sampling the output signal a predetermined sampling frequency determining the sampling rate is used, which is independent of the maximum frequency and actual period of the output signal. In order to obtain a sufficiently accurate sampling result, in a development of the invention it is provided that a sampling frequency is selected, which is in the range of 100 to 5000 Hz, preferably in the range of 500 to 2500 Hz, in a particularly preferred manner is approximately 1000 Hz.

As regards the duration of a measuring cycle, the invention provides, for example, that the measuring cycle comprises a period of time in the region of 0.1 s to 5 s, preferably in the region of 0.5 s to 2.5 s, in a preferred manner of approximately 1 s. Such measuring cycles allow a sufficiently accurate rotational speed determination combined with a short response time of the motor vehicle electronic control system using the measured wheel speed.

In order to prevent the determination, under strong disturbing influences, of a plurality of signal levels that then have to be analyzed later for their usefulness, the method according to the invention in a development provides that specific conditions are set, the meeting of which is checked after a measurement result is obtained. Thus, according to the invention it is provided, for example, that a signal level is determined only when the sampled values determining said signal level comprise a fraction of at least 10%, preferably at least 15%, of all of the sampled values determined in the measuring cycle. Signal levels, of which the sampled values determining said signal levels comprise a smaller fraction, are therefore for example "rejected" as noise or the like.

As already explained with regard to the prior art, it may be necessary for two signal levels to be measured. For this purpose, the method according to the invention in a development provides that those signal levels, the sampled values of which present the two relatively most frequently occurring amplitude ranges, are measured. All of the remaining determined signal levels are filtered out from the start. In this connection, a development of the invention provides that the two signal levels are determined only when the sampled values determining said signal levels together comprise a fraction of at least 40%, preferably of at least 50%, of all of the sampled values determined in the measuring cycle. If this criterion is not met, then according to this embodiment the corresponding measurement is regarded as a faulty measurement. In the method according to the invention, it may further be provided that the two signal levels are determined and/or released for further processing only when the current intensities differ from one another by a predetermined minimum differential value, preferably by at least 1 mA. This measure makes it possible to use even fluctuating amplitude values to determine a specific signal level.

The previously discussed conditions may be logically combined in different ways. Thus, in a variant of the invention it is possible that all of the conditions have to be met in order to determine a signal level, the term "AND operation" being used in this connection. Other variants of the invention, on the other hand, may provide that only one of the conditions has to be met in order to determine a signal level (OR operation) or that only some of the conditions have to be met.

In a development of the invention, it may be provided that on the basis of the determined signal level an error handling procedure is initiated. The error handling procedure may run always after the determination of a signal level or on completion of a measuring cycle and on the basis of specific properties of the determined signal level may start different routines. For example, by means of the error handling procedure a corresponding electronic control system, such as for example a vehicle brake system or a traction control system, may be switched over to an emergency operating mode, in which malfunctions as a result of defective speed determination are excluded. According to the invention, the error handling procedure may be devised in such a way that the emergency operating mode is activated, for example, only once a predetermined period of time has elapsed after the end of the respective measuring cycle. The predetermined period of time is in said case dimensioned in such a way that, for example, one or more measuring cycles are waited out and their measuring results are checked before the long-term reliability or defectiveness of the rotational speed measurement may finally be established. In this way, a premature activation of the emergency operating mode may be avoided. In the error handling procedure, the plausibility of a determined signal level may be determined and on this basis a suitable routine, e.g. the normal operating mode or the emergency operating mode, may be activated.

In a development of the method according to the invention, it may be provided that the amplitudes occurring during the measuring cycle and the rate of occurrence of sampled values of an amplitude lying within a predetermined amplitude range are stored temporarily.

The invention further relates to an apparatus for measuring rotational speeds, in particular wheel speeds of a wheel of a motor vehicle, comprising a speed sensor for measuring an output signal describing the actual rotational speed, a sampling device for sampling the output signal, and a signal processing device for further processing of the output signal sampled by the sampling device. The apparatus according to the invention is designed in particular for implementing the previously discussed method according to the invention. According to the invention, it further provides that the output signal is sampled at a predetermined sampling rate over at least one measuring cycle, that in each case the amplitude of sampled values obtained in the measuring cycle is determined and that from the rate of occurrence of sampled values of an amplitude falling within a predetermined amplitude range at least one signal level occurring during the measuring cycle in the output signal is determined. In said case, the sampling device may be designed to output time-discrete sampled values. Furthermore, the signal processing device may comprise a counting device for determining the rate of occurrence of sampled values of an amplitude lying within a predetermined amplitude range during the measuring cycle. This counting device may take the form of a continuous counter, but it is equally possible for the counting device to be resettable to an initial value, preferably to "0", at the start of a new measuring cycle.

As regards the design of the signal processing device, it may be provided that it comprises a memory for temporarily storing the amplitudes occurring during the measuring cycle and the rate of occurrence of sampled values of an amplitude lying within a predetermined amplitude range. The apparatus according to the invention, in particular the signal processing device thereof, may further comprise at least one evaluation device for checking predetermined properties of the output signal. In a variant of the invention, in this connection it may be provided that the evaluation device allows determination of a signal level during a measuring cycle when the sampled values determining the signal level comprise a fraction of at least 10%, preferably of at least 15%, of all of the sampled values obtained in the measuring cycle. In addition or alternatively, the invention may provide that the evaluation device during a measuring cycle allows a determination of only a predetermined number of signal levels, preferably of only two signal levels, when the sampled values determining said signal levels together comprise a fraction of a least 40%, preferably of at least 50%, of all of the sampled values obtained in the measuring cycle. Finally, in a development of the invention it may be provided that the evaluation device, in addition or alternatively to the previously discussed functions, allows a determination of a plurality of signal levels when the amplitudes of the sampled values determining said signal levels comprise current intensities that differ from one another by at least 1 mA.

Other advantages of this invention will become apparent to those skilled in the art from the following detailed description of the preferred embodiment, when read in light of the accompanying drawings.

DETAILED DESCRIPTION OF THE INVENTION

Figure 1:
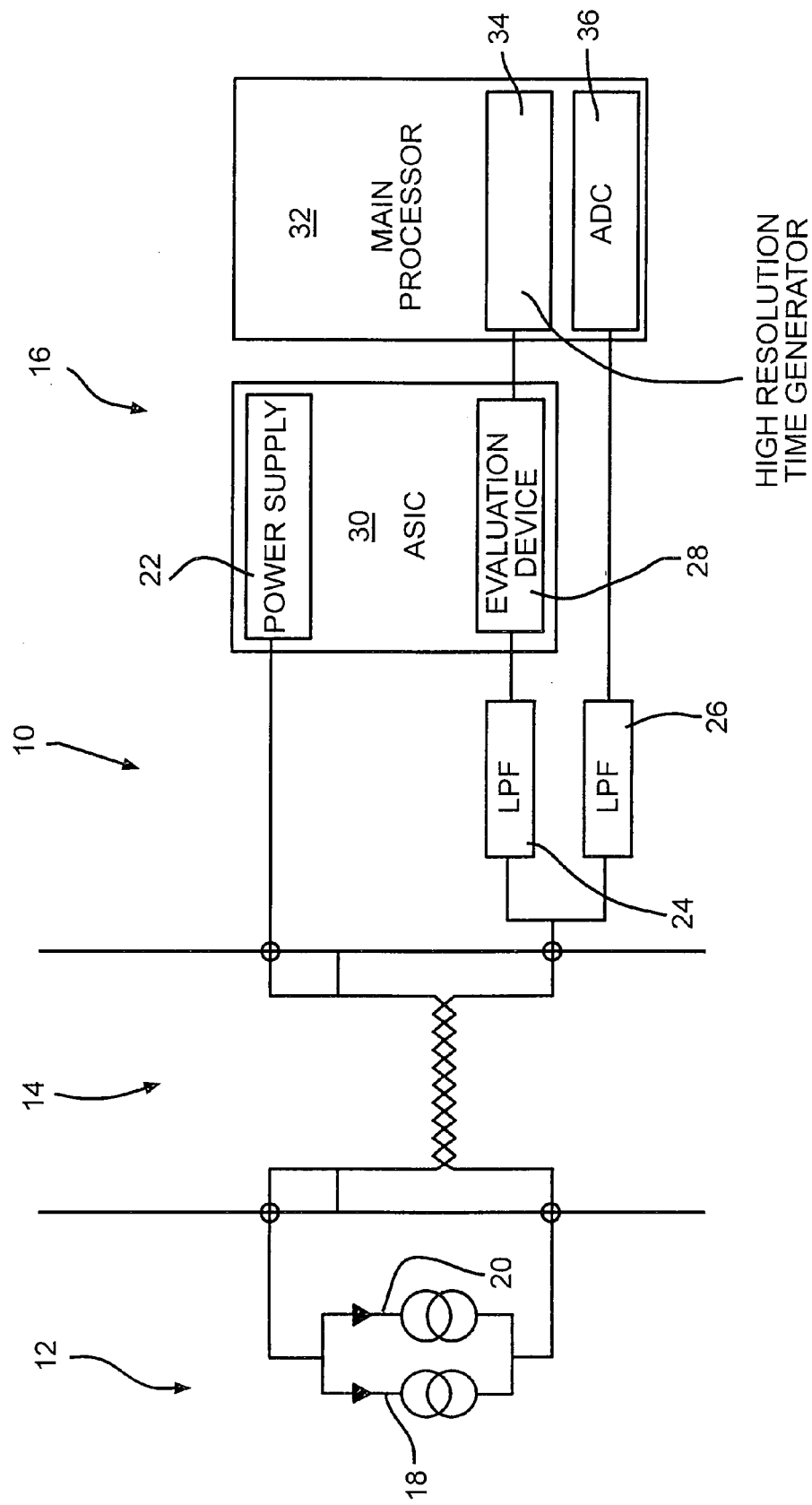
FIG. 1 a schematic representation of the apparatus according to the invention in the form of a block diagram.

In FIG. 1 an apparatus according to the invention is generally denoted by 10. It comprises a wheel speed sensor 12, wiring 14 and a signal processing unit 16.

The vehicle sensor 12 comprises two signal paths, namely a signal path 18 that delivers a "high" current of e.g. 14 mA when the sensor 12 detects a specific event, e.g. an inductive excitation, and the signal path 20 that delivers a "low" current of e.g. 7 mA when the sensor 12 is in its idle state. The wheel speed sensor 12 is connected by the wiring 14 to the signal processing unit 16. The signal processing unit comprises a power supply unit 22 for the wheel speed sensor 12, a first low-pass filter 24 and a second low-pass filter 26. The signal processing unit 10 further comprises an evaluation device 28, which interrogates specific properties of the output signal of the wheel speed sensor 12 obtained by the low-pass filter 24. More details about this will be provided below.

The power supply unit 22 for the wheel speed sensor 12 as well as the interrogation filter 28 are combined into an application-specific integrated circuit (ASIC) 30. This is connected to a main processor 32. The main processor 32 comprises a high-resolution time generator 34 and an analogue-to-digital converter 36. The time generator 34 is connected to the evaluation device 28. The analogue-to-digital converter 36 is connected to the low-pass filter 26.

According to FIG. 1, the apparatus 10 according to the invention measures a wheel speed by means of a wheel speed sensor 12 and supplies a corresponding analogue a.c. signal via the wiring 14 to the signal processing unit 16. This output signal is then first filtered by means of the low-pass filters 24 and 26 and subjected to further processing, which is described in more detail below with reference to FIGS. 2 to 5.

Figure 2:
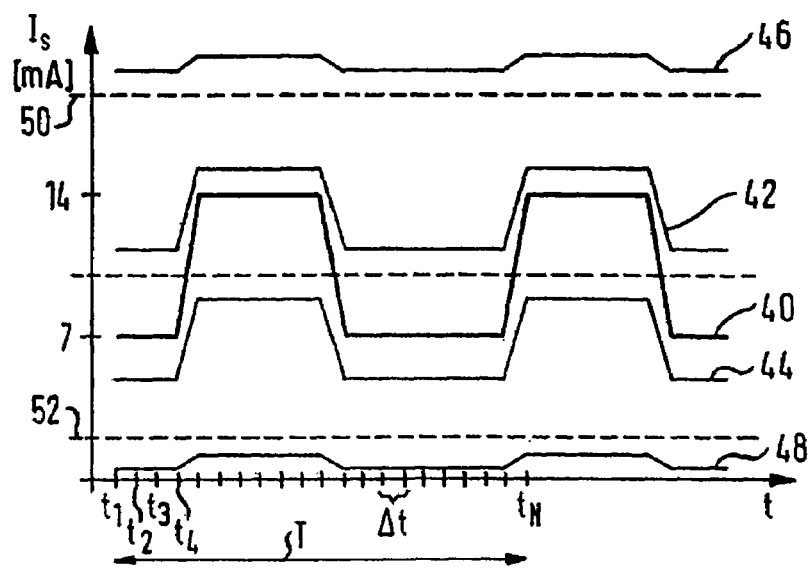
FIG. 2 a graph reproducing various signal characteristics of the output signal.

FIG. 2 shows various characteristics of the analogue output signal of the speed sensor 12. In FIG. 2 the current intensity $I_S$ of the sensor 12 is plotted in mA against time. An ideal characteristic of the output signal supplied by the speed sensor 12 is denoted by 40. This signal characteristic 40 presents substantially two discrete signal levels, namely a "low" level at 7 mA and a "high" level at 14 mA. From the period of the change of the signal levels between 7 mA and 14 mA the wheel speed may be determined. Within a predetermined time period T, which is subdivided into N equal time intervals $\Delta t$, the output signal is sampled N times. Thus, at each instant $t_1, t_2, t_3, \ldots t_N$ a specific sampled value of a signal amplitude assigned thereto, which corresponds to the respective signal level, is obtained.

FIG. 2 further shows how disturbing influences or malfunctions of the speed sensor 12 may lead to other signal characteristics that differ from the signal characteristic 40. Thus, for example, the signal characteristics 42 and 44, because of disturbing influences in the vehicle electronics, a faulty power supply unit of the speed sensor 12 or the like, are indeed displaced, in terms of the occurring current intensities, relative to the signal characteristic 40. They do however, despite this value-related displacement, allow rotational speed measurement since they present substantially two discrete signal levels. However, given such voltage signals 42 and 44 displaced on account of disturbing influences or the malfunction of various components, fault recognition may already be necessary. It may lead, for example, to deactivation of various electronic systems for safety reasons. Conventional systems are capable of such fault recognition either not at all or only with a high hardware outlay in order to be able to effect sampling in accordance with Shannon's sampling theorem.

FIG. 2 additionally shows two further signal characteristics 46 and 48, which lie above and below specific threshold values 50 and 52 respectively. Such markedly displaced signal characteristics are already detectable even by conventional systems, e.g. through the use of threshold value sensors, which detect a short circuit or a line interruption.

According to the invention, in the time period T the output signal produced by the speed sensor 12 is sampled N times. This occurs according to the flowchart of FIG. 5 after the start of the procedure according to step S1 in step S2. At a discrete instant, e.g. $t_1, t_2$, etc., in each case the actual sensor current is measured. At the same time, the amplitude of the sensor current is measured and an amplitude counter, to which an amplitude range including this amplitude is assigned, is incremented by the value 1.

Figure 3:
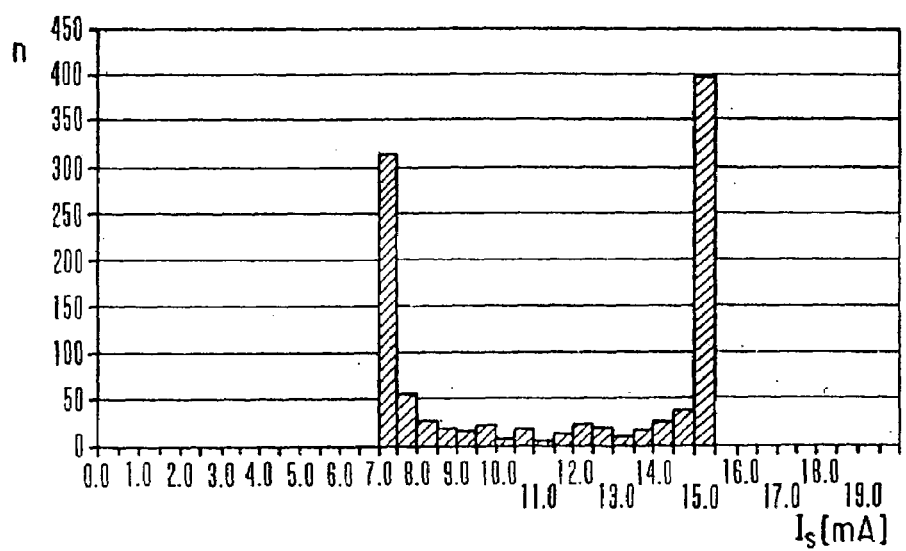
FIG. 3 a histogram reproducing the distribution of sampled values obtained in a measuring cycle.

In step S3, the respective values of the amplitude counter are entered into a histogram according to FIG. 3. In this histogram, the respective counter readings n are plotted against the amplitude values. In other words, to each amplitude value between 0 and 19 mA with an amplitude range width of in each case 0.5 mA an amplitude counter is assigned. The interrogation of the actual sensor current according to step S2 and the entry into a histogram according to step S3 is carried out N times. This means that in step S4 after each interrogation a counter N is incremented and in step S5 it is checked whether a limit value, e.g. the value 1000 given a sampling frequency of 1000 Hz, has already been reached. If not, steps S2 to S5 are repeated. If, however, the condition according to step S5 is met, then the actual measuring cycle is terminated and a determination of current may be effected from current levels from the histogram according to FIG. 3.

FIG. 3 further shows how during the measuring cycle in the amplitude range between 7 and 7.5 mA sampled values have occurred at a rate of approximately 315 and in the amplitude range between 15 and 15.5 mA sampled values have occurred at a rate of approximately 395. The remaining rates of occurrence of sampled values of different amplitudes are markedly lower. The next lower rate of occurrence is approximately 55. FIG. 3 then allows easy determination of the two signal levels characterizing the output signal 40 in that in each case one amplitude value from the two amplitude ranges having the sampled values with the relatively highest rate of occurrence during the measuring cycle is used as a signal level. This occurs in step S6 of FIG. 5. The remaining sampled values arise, for example, because of sampling during an ascending or descending edge or because of disturbing influences.

Figure 4:
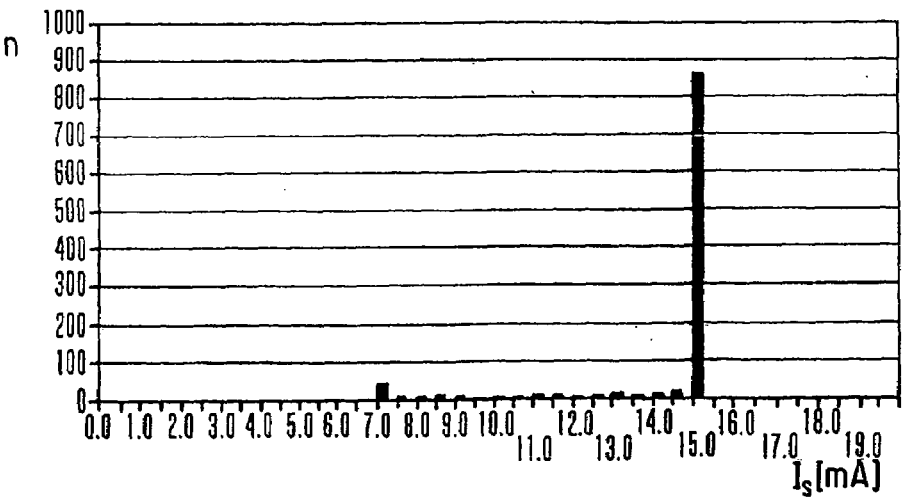
FIG. 4 a histogram similar to FIG. 3, which shows a faulty measurement.

FIG. 4 shows a histogram that differs markedly from the histogram according to FIG. 3. According to this histogram, the rate of occurrence of sampled values in a measuring cycle is approximately 860 for amplitudes between 15.0 and 15.5 mA. The remaining sampled values of an amplitude differing therefrom occur at an almost negligible rate. Only the sampled values of an amplitude between 7.0 and 7.5 mA still occur at a rate of approximately 40. A histogram according to FIG. 4 arises, for example, when the sampling rate N per measuring cycle is substantially identical to the frequency of the output signal produced by the speed sensor 12. This means that sampling of the output signal occurs substantially every time this signal has reached a specific signal level, e.g. the "high" current. In the case of other signal levels, in accordance with the predetermined sampling rate sampling occurs comparatively seldom. A histogram according to FIG. 4 cannot however be used to determine two current levels.

In order to distinguish measuring cycles with usable measuring results from measuring cycles with unusable measuring results, in an embodiment of the invention it is provided that the signal processing unit 16 checks the output signal of the speed sensor 12 for the fulfillment of predetermined conditions. This occurs in step S7. Such conditions may be:
- the amplitude counter readings belonging to the two signal levels to be determined have to contain in each case a minimum fraction of all of the measurements, e.g. 15% or 20% or more;
- the amplitude counter readings belonging to the signal levels to be determined have to be higher than the sum of all of the remaining counter readings that arise from measurements during the edge or because of disturbing influences,
- the difference between the two signal levels has to be at least a specific current intensity value, e.g. 1 mA.

Figure 5:
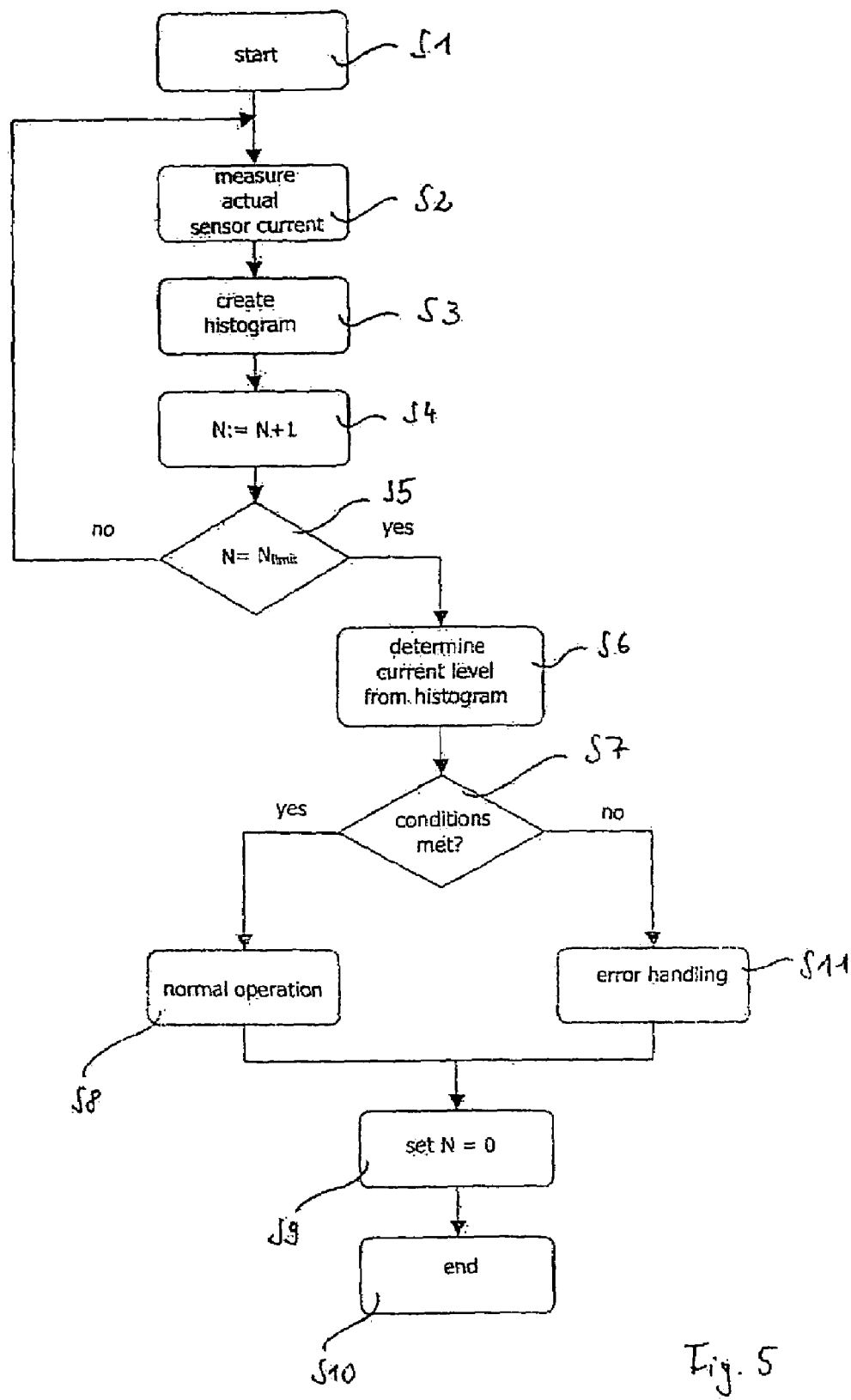
FIG. 5 a rough flowchart of the method according to the invention.

These conditions may be logically combined with one another, e.g. as an AND operation or an OR operation. In the present embodiment, they are combined in an AND operation, i.e. each of the conditions has to be met to allow an effective signal level determination. If the result of step S7 according to FIG. 5 is that all of the conditions are met, then the histogram may be correspondingly evaluated, i.e. the current levels may be determined and used for further signal processing. This is represented by step S8. The counter N is then set to zero and (step S9) and the procedure is then terminated in step S10, thereby allowing it to be started anew for a further measuring cycle. If the result of step S7 is that not all of the predetermined conditions are met by the current levels determined from the histogram, then according to step S11 an error handling procedure is initiated, which may lead for example to deactivation of a traction control system or the like.

The invention therefore presents a way of reliably monitoring the function of a speed sensor and sampling the output signal thereof that is relatively easy to carry out and in particular may be realized with a low hardware outlay.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. Method of measuring a rotational speed, in particular a rotational speed of a wheel of a motor vehicle, by means of a speed sensor, wherein the speed sensor produces an output signal characterizing the actual rotational speed and wherein the output signal of the speed sensor is sampled at a predetermined sampling rate over a least one measuring cycle and in each case the amplitude of sampled values obtained in the measuring cycle is determined, characterized in that from a rate of occurrence of sampled values of an amplitude lying within a predetermined amplitude range at least one signal level occurring during the measuring cycle in the output signal is determined, and supplying the at least one signal level to a vehicle brake system.

2. Method according to claim 1, wherein from the rate of occurrence of sampled values of an amplitude lying within a predetermined amplitude range per measuring cycle a histogram is created, from which the signal level is determined.

3. Method according to claim 1, wherein a predetermined number of amplitude counters is provided, wherein to each amplitude counter a specific amplitude range is assigned and wherein each amplitude counter is incremented when during the measuring cycle a sampled value has an amplitude value that falls within the amplitude range assigned thereto.

4. Method according to claim 3, wherein as sampled current values of the output signal are determined, a corresponding value from a predetermined measuring range is assigned to each amplitude counter.

5. Method according to claim 3, wherein each amplitude counter is set to zero at the start of a measuring cycle.

6. Method according to claim 1, wherein a sampling frequency determining the sampling rate is selected which is in the range of 100 to 5000 Hz.

7. Method according to claim 1, wherein the measuring cycle comprises a period of time in the range of 0.1 s to 5 s.

8. Method according to claim 1, wherein a signal level is determined only when the sampled values determining said signal level comprise a fraction of at least 10%-of all of the sampled values determined in the measuring cycle.

9. Method according to claim 1, wherein two signal levels are determined from the sampled values of the two relatively most frequently occurring amplitude ranges.

10. Method according to claim 9, wherein the two signal levels are determined only when the sampled values determining said signal levels together comprise a fraction of at least 40%-of all of the sampled values determined in the measuring cycle.

11. Method according to claim 9, wherein the two signal levels are determined only when their current values differ from one another by a predetermined minimum differential value-of at least 1 mA.

12. Method according to claim 1, wherein on the basis of the determined signal level an error handling procedure is initiated.

13. Method according to claim 12, wherein the error handling procedure is a function of the determined signal level and an emergency operating mode is initiated only after a predetermined period of time has elapsed after the end of the measuring cycle.

14. Method according to claim 1, wherein the amplitudes that have occurred during the measuring cycle and the rate of occurrence of sampled values of an amplitude lying within a predetermined amplitude range are stored temporarily.

15. Apparatus for measuring rotational speeds, in particular wheel speeds of a wheel of a motor vehicle, comprising:
   a speed sensor for measuring an output signal describing the actual rotational speed;
   a sampling device for sampling the output signal at a predetermined sampling rate per measuring cycle; and
   a signal processing device for further processing of the output signal sampled by the sampling device and for determining the amplitudes of sampled values obtained in the measuring cycle, wherein the signal processing device from a rate of occurrence of sampled values of an amplitude lying within a predetermined amplitude range determines at least one signal level occurring during the measuring cycle in the output signal, said signal processing device also operative to supply said at least one signal level to a vehicle brake system.

16. Apparatus according to claim 15, wherein the sampling device is designed to output time-discrete sampled values.

17. Apparatus according to claim 15, wherein the signal processing device comprises a counting device for determining the rate of occurrence of sampled values of an amplitude lying within a predetermined amplitude range during the measuring cycle.

18. Apparatus according to claim 17, wherein the counting device is resettable to an initial value-at the start of a new measuring cycle.

19. Apparatus according to claim 15, wherein the signal processing device comprises a memory for temporarily storing the amplitudes that have occurred during the measuring cycle and the rate of occurrence of sampled values of an amplitude lying within a predetermined amplitude range.

20. Apparatus according to claim 15, wherein the signal processing device comprises at least one evaluation device for checking predetermined properties of the output signal.

21. Apparatus according to claim 20, wherein the evaluation device allows a determination of a signal level during a measuring cycle when the sampled values determining the signal level comprise a fraction of at least 10%-of all of sampled values obtained in the measuring cycle.

22. Apparatus according to claim 21, wherein the evaluation device during a measuring cycle allows a determination of only a predetermined number of signal levels, preferably of only two signal levels, when the sampled values determining said signal levels together comprise a fraction of at least 40%-of all of the sampled values obtained in the measuring cycle.

23. Apparatus according to claim 20, wherein the evaluation device allows a determination of a plurality of signal levels when the amplitudes of the sampled values determining said signal levels comprise current values that differ from one another by at least a predetermined differential value of at least 1 mA.

* * * * *